May 20, 1952 J. C. ABBOTT 2,597,274
CARBURETOR TESTING MACHINE
Filed Nov. 18, 1950 2 SHEETS—SHEET 1
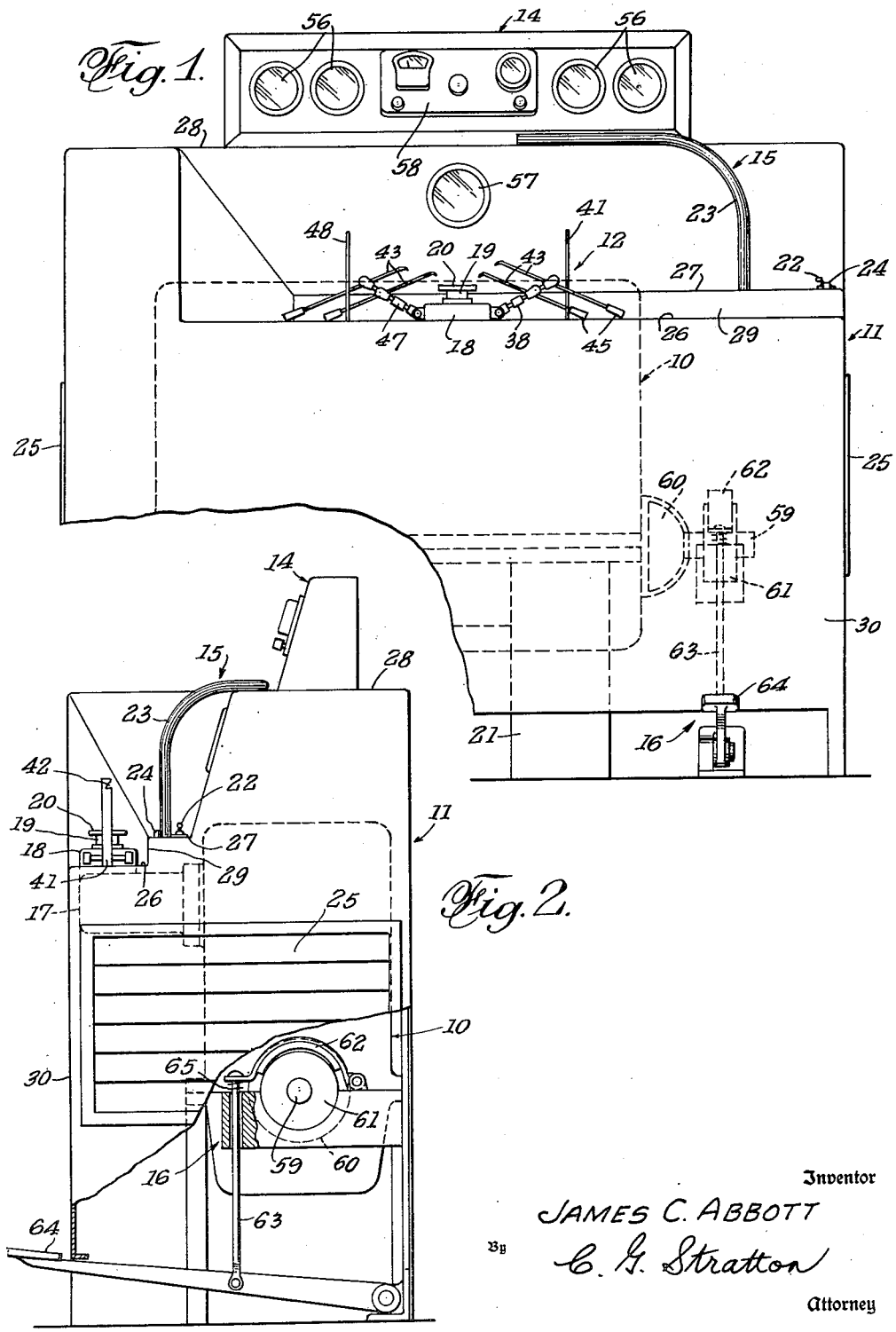
Inventor
JAMES C. ABBOTT
By C. G. Stratton
Attorney May 20, 1952 J. C. ABBOTT 2,597,274
CARBURETOR TESTING MACHINE
Filed Nov. 18, 1950 2 SHEETS—SHEET 2
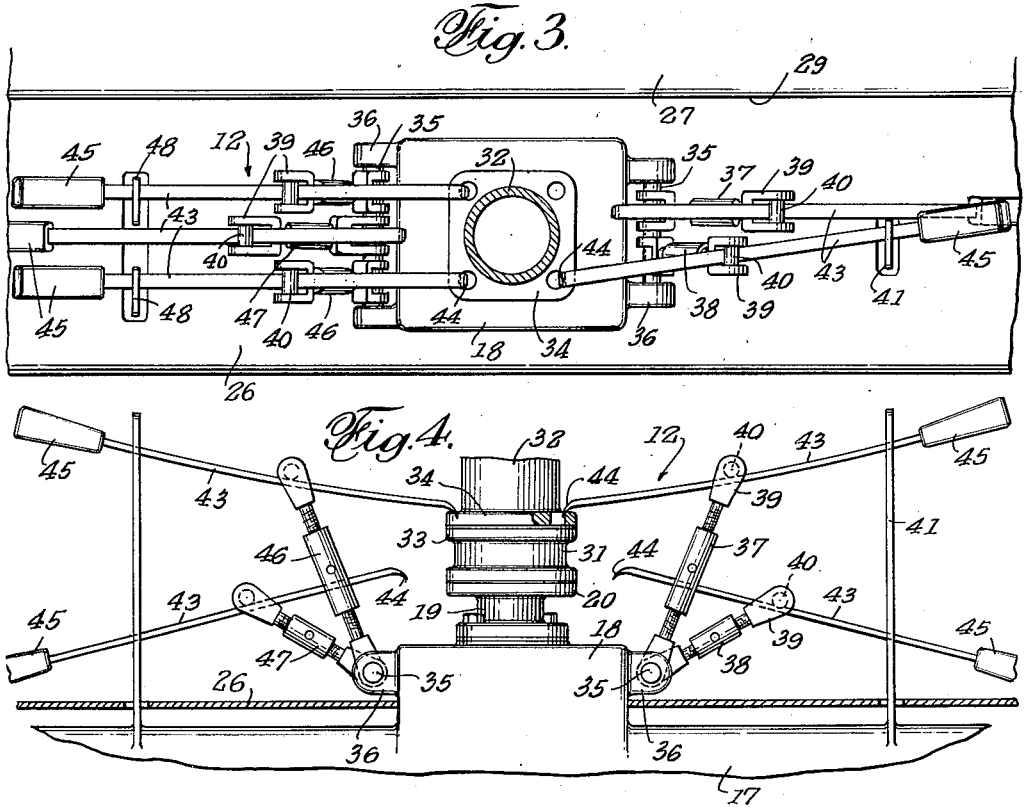
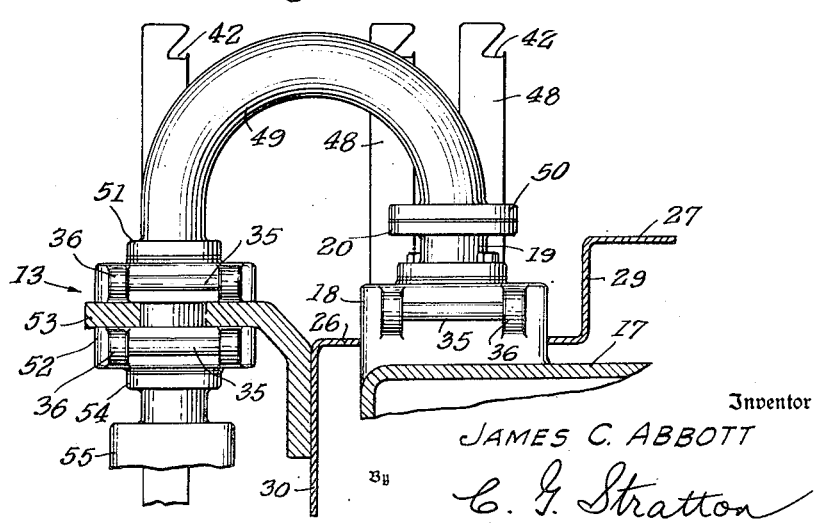
Inventor
JAMES C. ABBOTT
By C. G. Stratton
Attorney

UNITED STATES PATENT OFFICE 2,597,274

CARBURETOR TESTING MACHINE

James C. Abbott, Los Angeles, Calif.

Application November 18, 1950, Serial No. 196,496

5 Claims. (Cl. 73—118)

This invention relates to a machine for testing carburetors, the same contemplating a device for testing the various adjustments of a carburetor before operative installation. The machine is adapted to test new, rebuilt, or carburetors that have been removed from their engines for cleaning, etc.

An object of the present invention is to provide a machine, as indicated, that is compact, efficient, and capable of testing all of the various carburetor adjustments so that little or no further adjustment is necessary upon operative installation of a carburetor tested by the machine.

Another object of the invention is to provide a carburetor testing machine that employs a stationary internal combustion engine to which the carburetor being tested is applied and in which the carburetor is so applied that the same is not subjected to the heat of said engine, but is shielded therefrom.

Another object of the invention is to provide a machine of the character indicated that is provided with novel engine-braking means whereby a sudden and temporary drop in the suction of the carburetor may be obtained, the same being employed to test the power by-pass circuit of the carburetor.

A further object of the invention is to provide novel quick-release means for holding a carburetor in place in a testing machine as contemplated herein.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a front elevational view, partly broken away, of a preferred form of the present invention.

Fig. 2 is an end view thereof partly in section.

Fig. 3 is an enlarged fragmentary plan view of the quick-release means for connecting a downdraft carburetor to the machine.

Fig. 4 is a front view thereof.

Fig. 5 is an end view of the means shown in Figs. 3 and 4 to which has been added quick-release means for connecting an updraft carburetor to the machine.

The machine that is illustrated in the drawings comprises, generally, an internal combustion engine 10, a cabinet 11 housing said engine, quick-release means 12 for connecting a downdraft carburetor to said engine, similar means 13 for connecting an updraft carburetor, generally conventional means, not shown but represented by instruments and devices 14, for reading the performance characteristics of engine 10 and for analyzing the combustion of said engine, means 15 for initially filling the float chamber of a carburetor preparatory to testing the latter, and brake means 16 for suddenly decelerating the engine to create a temporary drop in the suction on the carburetor to test the power by-pass circuit of said carburetor.

The engine 10 is a conventional internal combustion engine, the same having an intake manifold 17 which, in this case, is provided with a centrally disposed, upwardly extending hollow part 18 that is provided with an upwardly extending fitting 19. Said fitting terminates in a horizontally disposed flange 20. Suitable support means 21 is provided for the engine. While only the engine is shown, it will be understood that the same is provided with a radiator, fuel tank, etc., so as to comprise a complete power plant comparable to that employed in automotive vehicles. Since the present machine is used indoors, it is preferred to locate the fuel tank at a remote and safe point and to create fuel flow therefrom independent of the operation of the engine. To this end, an independent electrically-operated pump, that is controlled by a switch 22, provides fuel flow in means 15, the latter comprising a flexible tube 23. The usual starter device of the engine is suggested by push button 24.

The cabinet 11 houses engine 10 and is provided with air-passing louvres 25 at the opposite ends, and above the engine, is formed by a recessed portion to have a shelf 26 through which manifold part 18 extends, a rearward and slightly elevated shelf 27 through which tube 23 extends and on which switch 22 and starter button 24 are mounted, and a top wall 28. It will be noted that shelves 26 and 27, together with vertical connecting panel 29, are interposed between engine 10 and manifold 17 thereof and fitting 19 to shield a carburetor placed on said fitting from the heat of said engine. It is clear that suitable heat insulating liners may be provided for shelves 26 and 27 and panel 29. In other respects, cabinet 11 may comprise a substantially rectangular housing of which front wall 30 terminates short of the floor supporting the cabinet substantially as shown.

There are two types of downdraft carburetors in general use. These are single carburetion and dual carburetion carburetors. The flange 20 is of such form as to mount a single carburetion carburetor in the same manner that said carburetor would be mounted on the engine of an automotive vehicle. For mounting dual carburetion carburetors, an adapter 31 is interposed between fitting flange 20 and carburetor 32, as shown in Fig. 4, the upper flange 33 of the adapter being formed in accordance with the form of mounting flange 34 of carburetor 32. Sealing gaskets of suitable shape are employed where desired. The means 12 is selected for clamping either the mounting flange of a single carburetion carburetor tightly against flange 20 or flange 34 of a dual carburetion carburetor tightly against flange 33 of adapter 31.

As best shown in Figs. 3 and 4, the means 12 comprises horizontal pivot rods 35 mounted on opposite ends of manifold extension 18 as by spaced ears 36. On one end, a longer turnbuckle 37 and a shorter turnbuckle 38 are swingably mounted on pivot rod 35, each turnbuckle, at its outer free end, being provided with a fork 39 across which extends a pin 40. It will be seen that turnbuckles 37 and 38 are swingable in a vertical plane on the horizontal pivot rod 35. Laterally spaced from pivot rod 35, there is provided a vertically extending member 41, that is advantageously affixed to manifold 17 as by welding. The upper end of said member 41 is provided with a laterally open notch 42. A strong, yet elastic bar 43 extends through the bifurcation of each fork 39 beneath cross pins 40 thereof. The end of each said member 43 directed toward extension 18 is formed to have a downwardly directed hook 44 and the opposite end of each member 43 is provided with a handle 45. The lengths of bars 43 are proportioned according to the spacing of member 41 from extension 18 so that engagement of hook 44 of either bar in a bolt hole of a carburetor mounting flange, such as flange 34, and engagement of the opposite end of each bar in notch 42, will result in flexion of that bar so engaged according to the effective length of turnbuckle 37 or 38, as the case may be. It will be clear that the bar 43 connected to turnbuckle 37 engages the more elevated carburetor flange 34 while, selectively, the bar 43 connected to turnbuckle 38 engages a lower flange of a carburetor placed directly on fitting 19.

While the carburetor clamping means on the other end may be the same as above described, there are shown three clamping bars 43 connected with two longer turnbuckles 46, and a shorter turnbuckle 47, respectively similar to turnbuckles 37 and 38. The bars 43 connected to turnbuckles 46 are used to engage spaced points of flange 34 while the bar connected to turnbuckle 47, selectively, is used to engage the flange of a carburetor placed directly on fitting 19. As before, the hooks 44 on said bars enter into the bolt holes of the carburetor flanges. Two members 48, similar to member 41, engage the clamping bars of the longer turnbuckles, while one of said members engages the third clamping bar.

It will be evident that a downdraft carburetor is quickly mounted and clamped in place by the means above described and as quickly released, thereby obviating time-consuming manipulation of bolts or screws.

The means 13 is shown in Fig. 5, the same comprising a gooseneck fitting 49 having a flange 50 on one end that is clamped in place on fitting 19 by means 12, and a flange 51 on the opposite end that is clamped to a hollow housing 52 on a forwardly projecting bracket 53 attached either to front wall 30 of the cabinet, as shown, or to manifold 17. Clamping means, similar to means 12, is employed to clamp flange 51 to the top of housing 52 and to clamp flange 54 of an updraft carburetor 55 to the bottom of said housing. In this manner, carburetor 55 is connected to manifold 17.

No particularized description for the instruments and devices 14 is deemed to be necessary, since these are usual, comprising gauges to show the water temperature of the engine, the oil pressure, and the rate of charge of the engine battery. The above are, conventionally, provided on the instrument panel of an automotive vehicle. In addition, a vacuum gauge 56 to read the degree of suction on the carburetor and a tachometer 57 to show engine speed, are provided. A conventional combustion analyzer 58 is also provided. The above gauges and instruments are positioned in direct view of the operator, as can be seen in Fig. 1.

The brake means 16 comprises a shaft 59 that extends from engine 10 and is driven thereby through a conventional fluid coupling 60. A brake drum 61 is carried on shaft 59, a brake shoe 62 is associated with said drum, a link 63 extends downwardly from said brake shoe, and a foot pedal 64 is connected to the lower end of said link. Brake shoe 62 is normally released from the brake drum as by a spring 65, and it will be clear that depression of the foot pedal will cause braking of shaft 59 to effect deceleration of the engine through coupling 60.

In operation, a carburetor is clamped in place by means 12 and is therefore connected to manifold 17. Tube 23 is then connected to the carburetor and serves as the fuel inlet therefor. Switch 22 is then snapped on to start flow of fuel to the float chamber of the carburetor. This primes the carburetor and also tests the setting of the needle valve and seat that controls flow of fuel to the float chamber.

Now, button 24 is pressed to start engine 10 and the various adjustments are made on the carburetor according to the reading of the gauges and devices of means 14. As in an automotive vehicle, the engine may be operated at idling speed or at increased speeds without load. The increased speeds are effected by manual manipulation of the throttle valve of the carburetor and the speed of the engine is read on tachometer 57. Thus, adjustments of the carburetor may be made at various engine speeds.

Carburetors are provided with a power by-pass jet that meters additional fuel required for high speed running or pulling under load, the same supplementing the fuel supplied by the main metering jet. This power by-pass jet comes into automatic operation when the suction in the manifold 17 is suddenly dropped as by a rapid forced acceleration of the engine. In effect, the engine is placed under load by such rapid acceleration and this load is simulated by means 16. By a sudden depression of foot lever 64, the shaft 59 is braked to rapidly decelerate the engine which, however, will not stall because of fluid coupling 60. Corrections, if needed, can now be made in the setting of the power by-pass jet to insure an increased supply of fuel to the carburetor venturi when a demand is made therefor under conditions as above stated.

By the means herein provided, a carburetor may be so completed, tested and adjusted that the same can now be removed from the machine and installed on the engine of an automotive vehicle with assurance that only the most minor supplementary adjustments will be needed, if needed at all.

While the invention that has been illustrated and described is now regarded as the preferred embodiment, the construction is, of course, subject to modifications without departing from the spirit and scope of the invention. It is therefore not desired to restrict the invention to the particular form of construction illustrated and described, but to cover all modifications that may fall within the scope of the appended claims.

Having thus described the invention, what is claimed and desired to be secured by Letters Patent is:

1. In a carburetor testing machine including an internal combustion engine having an intake manifold and a carburetor-mounting fitting secured to said manifold, means for clamping the mounting flange of a carburetor to said fitting, said means comprising strong yet flexible elongated members, each having a hooked end engaged with the carburetor flange and a handle on the opposite end, a length-adjustable and swingable member on a fixed pivot and having flexion engagement with an intermediate portion of each elongated member, and a support for each latter member adjacent the handle thereof to releasably hold the flexion of the elongated members.

2. In a machine according to claim 1: a set of said carburetor flange-clamping means on each side of the carburetor-mounting fitting to engage opposite sides of the carburetor mounting flange.

3. In a machine according to claim 1: the mounting fitting being adapted to receive a single carburetion carburetor, an adapter positionable on said fitting and adapted to receive a dual carburetion carburetor, a set of said carburetor flange-clamping means on each side of said carburetor-mounting fitting, there being at least two flexible clamping members to each set and the members of each set being selectively operatively engageable with a carburetor-mounting flange.

4. In a machine according to claim 4: the mounting fitting being adapted to receive a single carburetion carburetor, an adapter positionable on said fitting and adapted to receive a dual carburetion carburetor, a set of said carburetor flange-clamping means on each side of said carburetor-mounting fitting, there being at least two flexible clamping members, and a like number of length-adjustable members to each set, the same being selectively operatively engageable with a carburetor-mounting flange.

5. A carburetor testing machine comprising, in combination, an internal combustion engine having an intake manifold, a cabinet housing said engine and manifold, a hollow portion on the manifold extending upwardly through the cabinet and adapted to mount a carburetor outward of the cabinet, a quick-release means for clamping the carburetor to said extension for test under operation of said engine, brake means for decelerating the engine by placing a load thereon during one phase of the test of the carburetor, a support extending forward of the cabinet adjacent the manifold extension, a tubular housing carried by said support and extending therethrough, said tubular housing having a downwardly facing flange adapted to engage the mounting flange of an updraft carburetor, a tubular gooseneck extending from the mentioned manifold extension to the tubular housing, and quick-release means for clamping said updraft carburetor and said gooseneck to said tubular housing, the first-mentioned quick-release means being adapted to clamp the gooseneck to the manifold extension.

JAMES C. ABBOTT.

REFERENCES CITED

The following references are of record in the file of this patent:

UNITED STATES PATENTS

| Number | Name | Date |
|---|---|---|
| 951,007 | Kirkpatrick | Mar. 1, 1910 |
| 2,130,900 | Presbrey | Sept. 20, 1938 |
| 2,248,938 | Bennett | July 15, 1941 |
| 2,315,196 | Gallione | Mar. 30, 1943 |
| 2,537,347 | Hieger et al. | Jan. 9, 1951 |